United States Patent
Boose et al.

(10) Patent No.: US 7,437,262 B2
(45) Date of Patent: Oct. 14, 2008

(54) SYSTEM AND METHOD FOR TESTING A DEVICE

(75) Inventors: William C. Boose, Howe, TX (US);
Dale A. Heaton, Plano, TX (US);
Patrick T. Bohan, Richardson, TX (US)

(73) Assignee: Texas Instruments Incorporated, Dallas, TX (US)

( * ) Notice: Subject to any disclaimer, the term of this patent is extended or adjusted under 35 U.S.C. 154(b) by 1158 days.

(21) Appl. No.: 10/643,109

(22) Filed: Aug. 18, 2003

(65) Prior Publication Data

US 2005/0044445 A1   Feb. 24, 2005

(51) Int. Cl.
*G06F 19/00* (2006.01)
*G06F 11/00* (2006.01)
(52) U.S. Cl. .................................. 702/122; 714/742
(58) Field of Classification Search ................ 702/117, 702/122; 714/10, 25, 724, 742; 324/754, 324/755, 765
See application file for complete search history.

(56) References Cited

U.S. PATENT DOCUMENTS

| | | | |
|---|---|---|---|
| 4,870,347 A * | 9/1989 | Cicerone | 324/114 |
| 6,541,991 B1 * | 4/2003 | Hornchek et al. | 324/755 |
| 6,625,558 B1 * | 9/2003 | Van Ausdall et al. | 702/117 |
| 6,744,267 B2 * | 6/2004 | Sauk et al. | 324/754 |
| 2005/0200376 A1 * | 9/2005 | Yee et al. | 324/765 |

* cited by examiner

*Primary Examiner*—Bryan Bui
(74) *Attorney, Agent, or Firm*—Yingsheng Tung; Wade James Brady, III; Frederick J. Telecky, Jr.

(57) ABSTRACT

A system for testing a device includes a processor that operates to execute instructions, where the instructions are used to test a device. The processor also operates to generate test signals associated with the test instructions. An interface apparatus is coupled to the processor and operates to communicate the test signals to the device. The interface apparatus includes connectors, where each connector operates to communicate at least one of the test signals.

19 Claims, 2 Drawing Sheets

SYSTEM AND METHOD FOR TESTING A DEVICE

TECHNICAL FIELD OF THE INVENTION

This invention relates generally to the field of device testing and more specifically to a system and a method for testing a device.

BACKGROUND OF THE INVENTION

Testing devices during production generally requires having the appropriate tester located proximate to the device under test. During production, various tests may be performed, which may require a variety of testers that may be manufactured by different vendors. One technique for making testers available during production is placing a tester at each testing station of a production line. This technique, however, may result in increased cost since multiple large, multi-function testers may be required throughout the production line. Moreover, typical multi-function testers often do not have the capabilities required to meet production testing requirements. Consequently, known techniques for testing devices may be unsatisfactory in certain situations.

SUMMARY OF THE INVENTION

In accordance with the present invention, disadvantages and problems associated with previous techniques for testing a device may be reduced or eliminated.

According to one embodiment, a system for testing a device includes a processor that operates to execute instructions, where the instructions are used to test a device. The processor also operates to generate test signals associated with the test instructions. An interface apparatus is coupled to the processor and operates to communicate the test signals to the device. The interface apparatus includes connectors, where each connector operates to communicate at least one of the test signals.

Certain embodiments of the invention may provide one or more technical advantages. A technical advantage of one embodiment may be that the cost of outfitting a production line with testers may be reduced by mobilizing and interfacing a custom test assembly to a device. Another technical advantage of one embodiment may be that capabilities not available in production line testers may be provided by using the custom test assembly. Yet another technical advantage of one embodiment may be providing a lower cost backup solution to a production line tester.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE DRAWINGS

Figure 1A:
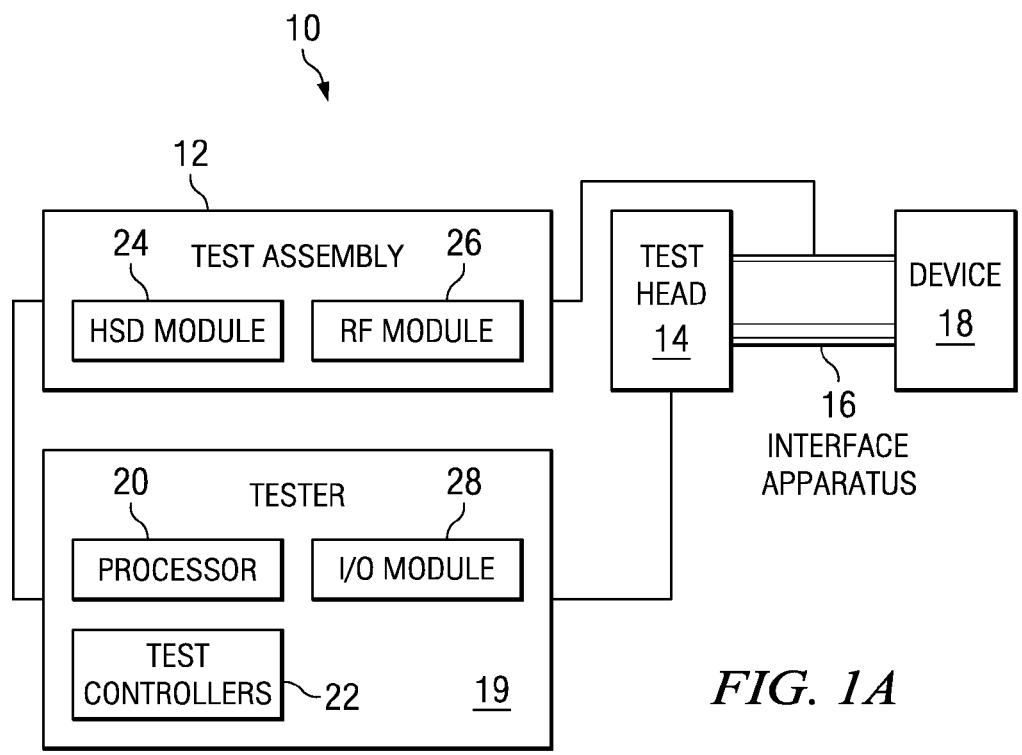
FIG. 1A is a block diagram of one embodiment of a test system that may be used in accordance with the present invention.
Figure 1B:
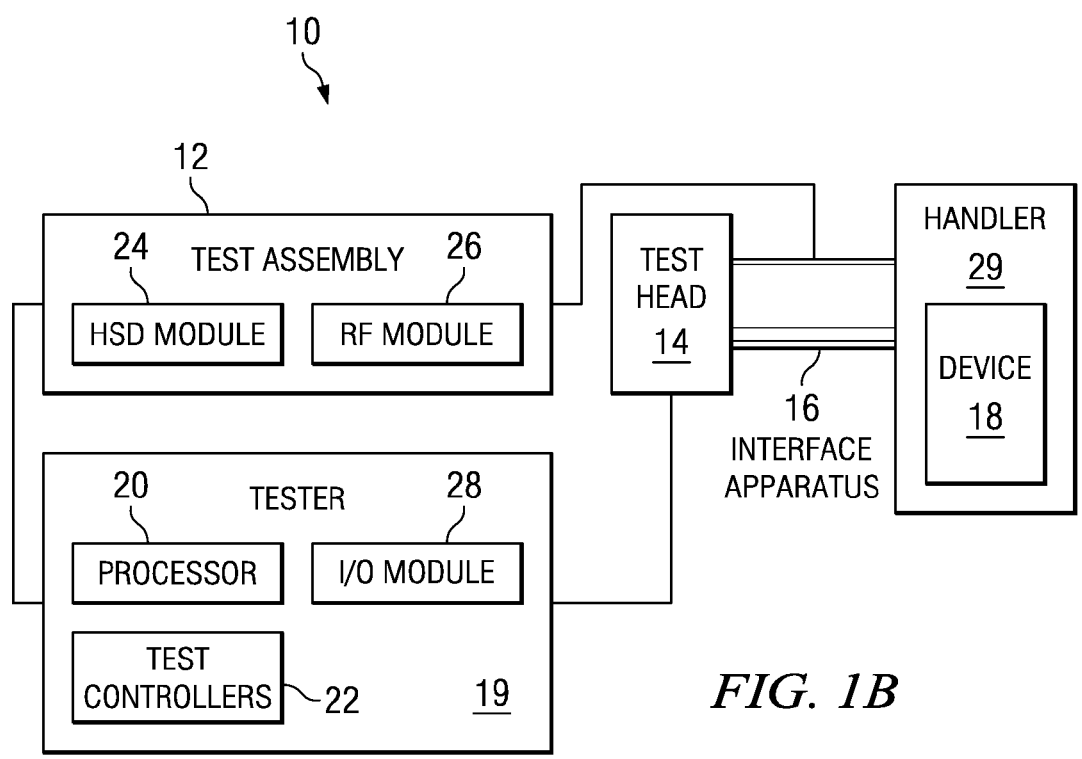
FIG. 1B is a block diagram of another embodiment of a test system that may be used in accordance with the present invention.
Figure 2A:
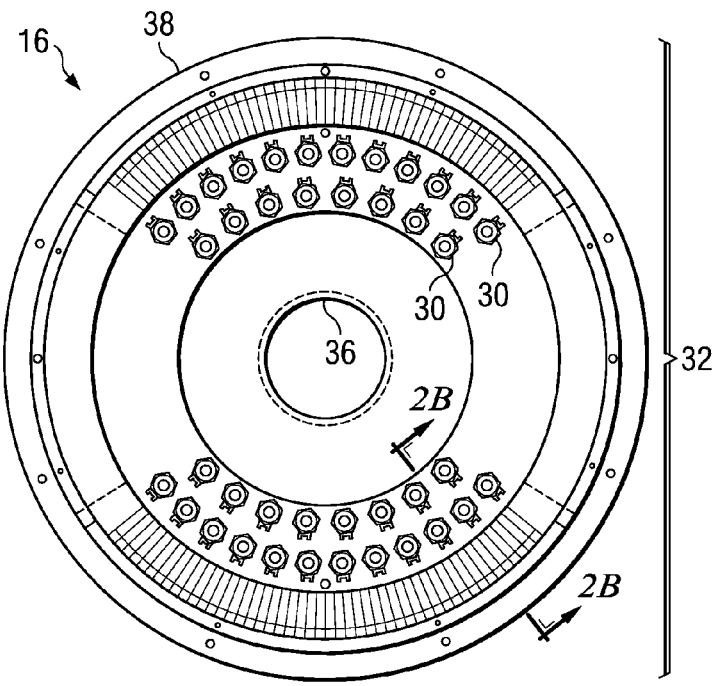
FIG. 2 is a diagram of an embodiment of an interface apparatus that may be used with the test system of FIGS. 1A-1B.
Figure 2B:
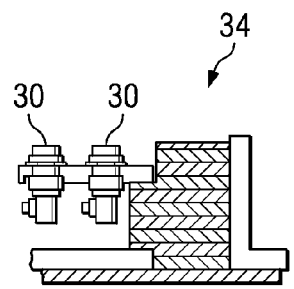
Figure 3:
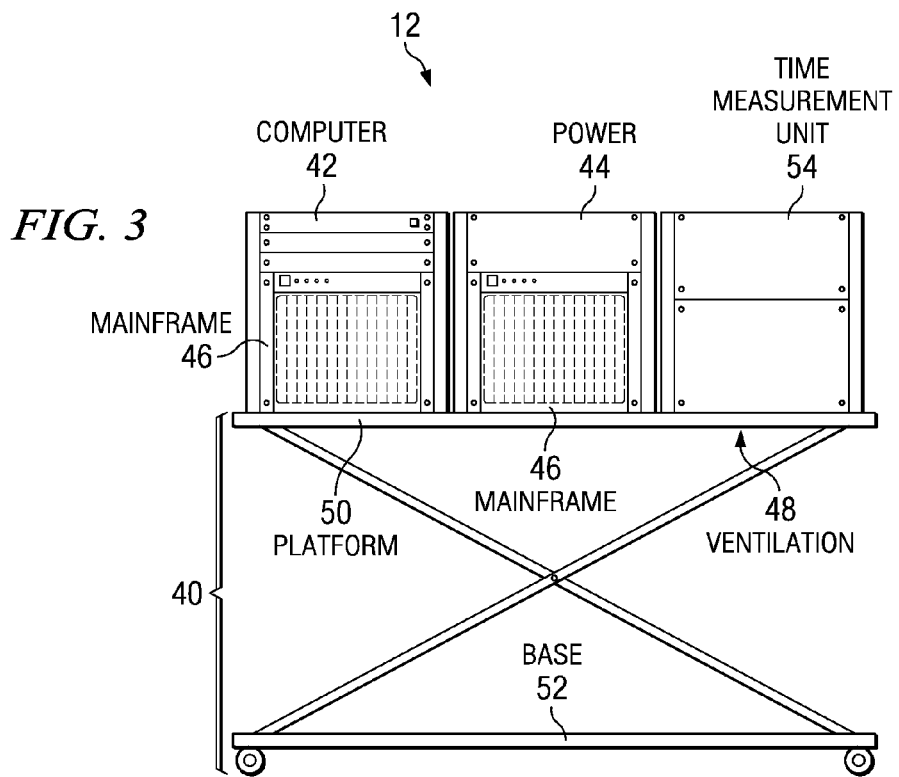
FIG. 3 is a diagram of an embodiment of a test assembly that may be used with the test system of FIGS. 1A-1B.

Embodiments of the present invention and its advantages are best understood by referring to FIGS. 1 through 3 of the drawings, like numerals being used for like and corresponding parts of the various drawings.

FIGS. 1A and 1B are block diagrams of embodiments of a test system 10 that may be used in accordance with the present invention. In general, test system 10 allows a test assembly 12 to interface with a device 18 using an interface apparatus 16 so that one or more test modules 24 and 26 at test assembly 12 may test device 18.

System 10 includes test assembly 12, tester 19, test head 14, interface apparatus 16, and device 18 coupled as shown in FIG. 1. Test assembly 12 includes test modules 24 and 26 that may be coupled with interface apparatus 16 and tester 19 as shown in FIG. 1. Test assembly 12 may be coupled with tester 19, interface apparatus 16, or any other module of test system 10 using all or a portion of a bus connection, one or more local area networks (LANs), metropolitan area networks (MANs), wide area networks (WANs), a global computer network such as the Internet, any other appropriate wire line, wireless, or other suitable link.

Test assembly 12 includes test modules 24 and 26 that test device 18. According to one embodiment, test modules 24 and 26 generate test signals that may be input into test device 18 in order to measure the response of device 18 to the signals. Test modules 24 and 26 may include, for example, instruments, signal processors, measuring devices, test boards, signal generators, or any other suitable processor that may generate test signals and measure responses to the test signals. According to the illustrated embodiment, test assembly 12 includes a high speed data module 24 and a radio frequency (RF) module 26.

High speed data (HSD) module 24 tests how device 18 processes digital signals. According to one embodiment, HSD module 24 may comprise a Parallel Bit Error Rate Tester (PARBERT). Any other suitable device for testing high speed data may be used at HSD module 24. RF module 26 tests how device 18 processes RF signals. According to one embodiment, RF module 26 may comprise a frequency response testing device or other suitable RF signaling testing device. Test assembly 12 may comprise more or fewer modules without departing from the scope of the invention. For example, test assembly 12 may be equipped with only a HSD module 24.

Tester 19 may be coupled to interface apparatus 16 and may forward to interface apparatus 16 the test signals generated by tester 19 or test modules 24 and 26. For example, tester 19 may forward to interface apparatus 16 a group of test signals generated by a PARBERT. According to another embodiment, tester 19 may be directly coupled with interface apparatus 16 so that the test signals may be directly forwarded to interface apparatus 16. According to the illustrated embodiment, tester 19 may include an Input/Output (I/O) module 28, a processor 20, and a test controller 22 to allow test assembly 12 to test device 18.

I/O module 28 receives input from the user and communicates output to a user. I/O module 28 may include devices such as a keyboard, a mouse, a touch screen, a pointing device, a scanner, a printer, disk drives, a display, communication links, or any other suitable device. According to one embodiment, test controller 22 may power up device 18, set device 18 in a particular mode of operation, program test modules 24 and 26 of test assembly 12 to run specific tests, or perform any other function that may controls the testing procedures at test system 10.

Processor 20 executes test instructions that may be used to test device 18. Processor 20 may access test modules 24 and 26 to initiate the generation of test signals associated with the test instructions. For example, processor 20 may execute test instructions corresponding to bit error rate testing so that HSD module 24 may generate test signals that may be used to test the bit error rate of device 18. Processor 20 may also initiate measurement of how device 18 processes the test signals.

Processor 20 may access test instructions from a memory that may be located at any module of test assembly 12 or tester 20. For example, processor 20 may access test instructions from a memory module that may be part of a computer at test assembly 12 or tester 20. According to one embodiment processor 20 may be housed in a computer that includes software for testing device 18. As used in this document "computer" refers to any suitable device operable to accept input, process the input according to predefined rules, and produce output, for example, a personal computer, work station, network computer, wireless telephone, personal digital assistant, one or more microprocessors within thee or other devices, or any other suitable processing device. Additionally, the computer may be adapted to execute any of the well known MS-DOS, PC-DOS, OS2, UNIX, MAC-OS, and Windows operating systems or any other suitable operating system.

Test head 14 applies the test signals to interface apparatus 16. According to one embodiment, test head 14 is coupled to interface apparatus 16 to receive the test signals and apply the test signals to interface apparatus 16. Test head 14 may include modules that may facilitate testing device 18. For example, test head 14 may comprise a calibration module that may be used to calibrate the applied test signals or signals communicated by interface apparatus 16.

Interface apparatus 16 comprises connectors that may be used to communicate test signals to device 18. According to one embodiment, interface apparatus 16 comprises one or more RF connectors, where each connector is operable to communicate an RF test signal to device 18. Interface apparatus 16 may comprise additional connectors, for example, High Speed Data connectors for communicating high speed data signals to device 18. Interface apparatus 16 may include more, fewer, or other connectors, and may communicate any suitable test signal to device 18 without departing from the scope of the invention. Interface apparatus 16 is more particularly described with reference to FIG. 2.

Device 18 receives the test signals from interface apparatus 18 and processes the test signals. According to one embodiment, device 18 processes the test signals according to a predetermined test procedure, such as a bit error testing procedure, and transmits the processed test signals back to interface apparatus 16 for further analysis by tester 19. Device 18 may be coupled with interface apparatus 16 to receive the test signals.

As illustrated in FIG. 1B, a handler may be coupled to interface apparatus 16 to automatically test device 18. Handler 29 may be used to automatically position device 18 such that interface apparatus 16 is proximate to device 18. Additionally, handler 29 may perform sorting of devices 18, control the temperature in a testing chamber, or handle device 18 in any other suitable fashion. In this embodiment, the coupling distance between device 18 and interface apparatus 16 may be kept at a short length suitable to minimize signal loss. The coupling distance between test assembly 12 and interface apparatus 16 may also be kept at a short length suitable to minimize loss.

Modifications, additions, or omissions may be made to system 10 without departing from the scope of the invention. For example, processor 20 may be located at test assembly 12. As another example, device 18 may receive test signals from any other suitable module of test system 10. As yet another example, test assembly 12 may include additional modules, such as power supply modules, as will be more particularly described with reference to FIG. 3. As used in this document, "each" refers to each member of a set or each member of a subset of a set. Additionally, functions may be performed using any suitable logic comprising software, hardware, other logic, or any suitable combination of the preceding.

A diagram of an embodiment of an interface apparatus that may be used with the test system of FIGS. 1A-1B is described with reference to FIG. 2. A diagram of an embodiment of a test assembly that may be used with the test system of FIGS. 1A-1B is described with reference to FIG. 3.

FIG. 2 is a block diagram of an embodiment of interface apparatus 16 that may be used with test system 10. According to the illustrated embodiment, interface apparatus 16 comprises an annular shaped device having an inner edge 36 and outer edge 38, where a plurality of connectors 30 may be arranged in rows between the inner edge 36 and outer edge 38. Although two rows of RF connectors are illustrated, interface apparatus 16 may comprise any suitable arrangement of connectors 30 without departing from the scope of the invention. Additionally, interface apparatus 16 may include any other connector 30 suitable for communicating test signals to device 18. For example, connectors 30 may include a high speed data connector (not shown) suitable for communicating high speed data signals to device 18.

Interface apparatus 16 comprises a coupling plane 32 and a cross-section 34. Coupling plane 32 may interface with device 18 or handler 29 as described with reference to previous embodiments. For example, coupling plane 32 may be disposed outwardly from device 18. Cross section 34 illustrates the profile of connectors 30. According to the illustrated embodiment, connectors 30 may comprise any suitable RF coaxial connector. For example, connectors 30 may comprise any suitable BLIND-MATE connector such as BLIND-MATE Omni-Spectra subminiature push-on (OSP) connectors. Any other connector 30 suitable for communicating signals in the frequency range required by device 18 may be used without departing from the scope of the invention.

Modifications, additions, or omissions may be made to interface apparatus 16 without departing from the scope of the invention. For example, connectors 30 may include high speed data connectors, such as "K" connectors, and OSP connectors. As another example, interface apparatus 16 may include more or fewer connectors 30 without departing from the scope of the invention. As yet another example, interface apparatus 16 may include a flex cable coupled to one end of connectors 30 so that the test signals may be transmitted to device 18 in a single cable bundle.

FIG. 3 is a block diagram of one embodiment of test assembly 12 that may be used with test system 10 in accordance with the present invention. According to the illustrated embodiment, test assembly 12 may be incorporated on a movable rack 40 so that test assembly 12 may be moved from various locations of a production line. The mobility of test assembly 12 may ensure that a coupling distance between test assembly 12 and interface apparatus 16 is sufficiently short, such as 1 meter, to maintain a minimum signal loss. This is of importance when communicating high speed data signals and high frequency RF signals, which may experience a higher loss at longer distances.

Test assembly 12, as illustrated, may include a computer 42, one or more mainframes 46, a power module 44 and a time measurement unit 54 mounted on a movable rack 40 as shown. As was described with reference to FIG. 1, test assembly 12 may include any device suitable for testing device 18 without departing from the scope of the invention.

Test assembly 12 may be mounted on platform 50 of movable rack 40 so that test assembly 12 may be lifted to a lift height. According to one embodiment, movable rack 40 may lift test assembly to any height in the range between 7 inches to 55 inches. Movable rack 40 may lift test assembly 12 at higher or lower heights without departing from the scope of the invention. Additionally movable rack 40 may move horizontally, vertically, or about any other suitable axis in order to ensure a sufficiently short coupling distance, which may maintain a minimum signal loss.

According to another embodiment, a ventilation base 48 may be used at platform 50 to ensure proper cooling of equipment. For example, platform 50 may be equipped with vents so that air may be properly circulated to effectively disperse the heat emanating from the modules of test assembly 12.

Modifications, additions, or omissions may be made to test assembly 12 and movable rack 40 without departing from the scope of the invention. For example, platform 50 may be rotated and lifted using electronic controls, such as an electronic lift. As another example, platform 50 may be equipped with hydraulic lifts.

Certain embodiments of the invention may provide one or more technical advantages. A technical advantage of one embodiment may be that the cost of outfitting a production line with testers may be reduced by mobilizing and interfacing a custom test assembly to a device. Another technical advantage of one embodiment may be that capabilities not available in production line testers may be provided by using the custom test assembly. Yet another technical advantage of one embodiment may be providing a lower cost backup solution to a production line tester.

Although an embodiment of the invention and its advantages are described in detail, a person skilled in the art could make various alterations, additions, and omissions without departing from the spirit and scope of the present invention as defined by the appended claims.

What is claimed is:

1. A system for testing a device, comprising:
    a processor in a automatic test operable to:
        execute a plurality of test instructions, the plurality of test instructions operable to test a device; the automatic tester not configured to have a radio frequency module;
    a test assembly including a high speed data (HSD) module and a radio frequency (RF) module operable to generate a plurality of test signals associated with the plurality of test instructions; and
    an interface apparatus coupled to the processor comprising a plurality of connectors operable to communicate the plurality of test signals from the test assembly to the device under test.

2. The system of claim 1, wherein the plurality of test signals comprises a radio frequency signal and a high speed digital signal.

3. The system of claim 1, wherein:
    the plurality of test signals comprises a radio frequency signal and a high speed digital signal; and
    the plurality of connectors comprises a first connector operable to communicate the radio frequency signal and a second connector operable to communicate the high speed digital signal.

4. The system of claim 1, wherein the interface apparatus comprises a coupling plane, the coupling plane comprising the plurality of connectors arranged in a plurality of rows.

5. The system of claim 1, wherein:
    the interface apparatus has an annular shape with an inner edge and an outer edge; and
    a portion of the plurality of connectors is arranged in a curved line between the inner edge and the outer edge.

6. The system of claim 1, wherein the the radio frequency module and the high speed data module are located at a test assembly comprising a movable rack, the movable rack operable to transport the test assembly from a first location to a second location.

7. The system of claim 1, wherein the the radio frequency module and the high speed data module are located at a test assembly comprising a movable rack, the movable rack operable to move the test assembly from a first height to a second height.

8. The system of claim 1, further comprising a test head coupled to the interface apparatus and operable to apply the plurality of test signals to the device.

9. The system of claim 1, further comprising a plurality of test modules coupled to the processor, the plurality of test modules operable to transmit the plurality of test signals to the interface apparatus.

10. The system of claim 1, further comprising a handler coupled to the interface apparatus and operable to automatically position the device substantially proximate to the interface apparatus.

11. An interface apparatus for communicating a plurality of signals, comprising:
    a plurality of first connectors, each first connector operable to communicate a test signal comprising a radio frequency signal generated by a radio frequency module; and
    a plurality of second connectors operable to communicate a test signal comprising a high speed data signal generated by a high speed data module.

12. The interface apparatus of claim 11, further comprising a coupling plane, the coupling plane comprising the plurality of first connectors and the plurality of second connectors arranged in a plurality of rows.

13. The interface apparatus of claim 11, wherein:
    the interface apparatus has an annular shape with an inner edge and an outer edge; and
    a portion of the plurality of connectors is arranged in a curved line between the inner edge and the outer edge.

14. A method for testing a device, comprising:
    executing a plurality of test instructions in a processor in an automatic tester not having a radio frequency module and a high speed data module, the plurality of test instructions operable to test a device;
    generating a plurality of test signals associated with the plurality of test instructions in a test assembly including a radio frequency module and a high speed data module; and
    communicating the plurality of test signals to the device using an interface apparatus, the interface apparatus comprising a plurality of connectors, each connector operable to communicate at least one signal of the plurality of test signals.

15. The method of claim 14, wherein the plurality of test signals comprises a radio frequency signal and a high speed digital signal.

16. The method of claim 14, wherein the plurality of test signals comprises a radio frequency signal and a high speed digital signal, and further comprising:
   communicating the radio frequency signal at a first connector of the plurality of connectors; and
   communicating the high speed digital signal at a second connector of the plurality of connectors.

17. The method of claim 14, wherein the interface apparatus comprises a coupling plane, the coupling plane comprising the plurality of connectors arranged in a plurality of rows.

18. The method of claim 14, wherein:
   the interface apparatus has an annular shape with an inner edge and an outer edge; and
   a portion of the plurality of connectors is arranged in a curved line between the inner edge and the outer edge.

19. A system for testing a device, comprising:
   a processor in an automatic tester, which does not include a radio frequency module and a high speed data module, operable to execute a plurality of test instructions, the plurality of test instructions operable to test a device; and
   a test assembly including a high speed data (HSD) module and a radio frequency (RF) module operable to generate a plurality of test signals associated with the plurality of test instructions, the plurality of test signals comprising a radio frequency signal and a high speed digital signal, located at a test assembly comprising a movable rack, the movable rack operable to transport the test assembly from a first location to a second location; and move the test assembly from a first height to a second height;
   an interface apparatus coupled to the processor and operable to communicate the plurality of test signals to the device, the interface apparatus comprising a coupling plane, the coupling plane comprising a plurality of connectors arranged in a plurality of rows, the interface apparatus having an annular shape with an inner edge and an outer edge, a portion of the plurality of connectors arranged in a curved line between the inner edge and the outer edge, each connector of the plurality of connectors operable to communicate at least one signal of the plurality of test signals, the plurality of connectors comprising a first connector operable to communicate the radio frequency signal and a second connector operable to communicate the high speed digital signal;
   a plurality of test modules coupled to the processor, the plurality of test modules operable to transmit the plurality of test signals to the interface apparatus;
   a test head coupled to the interface apparatus and operable to apply the plurality of test signals to the device; and
   a handler coupled to the interface apparatus and operable to automatically position the device substantially proximate to the interface apparatus.

* * * * *